July 15, 1930. C. F. LOCKMAN 1,770,539

CUSHIONING STRIP FOR SLIDING WINDOW PANES

Filed Aug. 5, 1927

INVENTOR:
CHRISTOPHER F. LOCKMAN
BY
ATTORNEY.

Patented July 15, 1930

1,770,539

UNITED STATES PATENT OFFICE

CHRISTOPHER F. LOCKMAN, OF LAKEWOOD, OHIO, ASSIGNOR OF ONE-THIRD TO FREDERICK W. WATSON, AND ONE-THIRD TO EDWARD W. LIVENSPARGER, BOTH OF CLEVELAND HEIGHTS, OHIO

CUSHIONING STRIP FOR SLIDING WINDOW PANES

Application filed August 5, 1927. Serial No. 210,783.

My invention relates to cushioning strips of channel-shaped cross-section adapted to be inserted in the grooves of window frames and to receive the sliding window member so as to make an anti-rattling and weatherproof joint between such frame and member.

It is particularly adapted for use in connection with windowed vehicles subjected to incessant vibration, such as automobiles of the closed-body type.

Heretofore cushioning strips have been made of rubber composition lined with felt or velvet and of channel cross-section, but the form of such cross-section has been such that it did not permit of the utilization of the resiliency of the flanges for effecting a tight fit between the strips and the grooves. In this previously used form, the resilience of the flanges was used to some extent to effect a tight joint between the flanges and the sliding window member, but as the rubber composition lost its life, its effectiveness was small and was lost in a comparatively short time.

Furthermore in this former type of strip, when excess friction existed between it and the window pane, the strip, by reason of its easy compressibility, would buckle, cause jamming and injury to the strip.

The object of the invention is to provide a strip of the above-described character, which will perform its function with a maximum of efficiency, retain such efficiency for a comparatively long period of time, and which will be adjustable so as to snugly and securely engage window grooves of various widths and at the same time snugly and securely engage sliding window members of various thicknesses and which will not buckle.

The said invention consists of means hereinafter fully described and particularly set forth in the claims.

The annexed drawing and the following description set forth in detail certain means for carrying out my invention, the disclosed means, however, constituting but one of the various mechanical forms in which the principle of my invention may be employed.

The illustrated embodiment of my invention is shown applied to automobile construction in which the sliding window member consists of a sheet of glass only.

Figure 1:
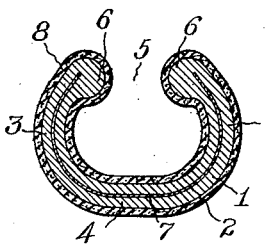
Figure 1 represents a transverse section on an enlarged scale of a cushioning strip in its normal form, that is when not in use, and embodying my invention.

The illustrated strip, Fig. 1, is of generally C-shaped channel cross-section and its main body-portion is formed of a suitable cushioning material 1, such as vulcanized and soft rubber and a resilient core member 2, embedded in said material. The flanges 3—3 are convexly bowed and the curvature thereof is such as to gradually merge their inner ends into the base 4 and form a constricted slot 5 at their outer ends. It will be noted, therefore, that the major transverse dimension of the strip is intermediate of the inner and outer ends or lips of the flanges. The lips of the flanges are preferably beaded as shown at 6—6, Fig. 1.

The resilient member 2, which forms a part of the strip, is preferably made of thin resilient sheet steel of channel cross-section and has its base 7 extending across and forming part of the base of the body-portion of the strip. The flanges of the said member 2 are convex, extend through and form part of the flanges of the strip and terminate preferably in the beaded portion of the latter.

The cross-sectional form of the member 2 is further such that it conforms with the cross-sectional form of the cushioning portion of the strip so that it may lie centrally in the latter, as shown.

The said main body-portion is preferably covered with felt or velvet 8 cemented to the surface of the cushioning material, so as to protect the latter and also reduce the frictional resistance to the glass pane.

The strip is made of a length suitable for application to a given groove 9, but is made considerably wider at its intermediate and major transverse dimension, than such groove. In applying the strip to the groove, it is pressed transversely to reduce its width from the normal (shown in dotted lines in Fig. 5) sufficiently to be inserted in such groove. This sets up internal strains which tend to restore the normal form of the cross-section. The strip in this contracted form is then inserted and pressed into the groove so as to engage the bottom thereof. On being released, the flanges spring outwardly, the resilience of the steel insert being sufficient to cause a tight and snug engagement with the sides of the groove.

In building automobile bodies intended to be exactly alike in all respects, it is found that the window grooves frequently and unintentionally vary in width between certain limits. It will be seen that inasmuch as the resilient flanges of the strip may be flexed so as to reduce the maximum transverse dimension of the strip, and upon release spring outwardly so as to increase such reduced dimension, a snug, tight fit may always be secured between the strip and sides of the grooves even when the width of the latter vary between such limits.

Figure 5:
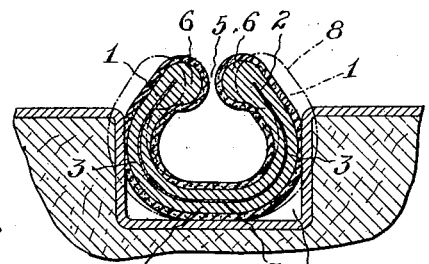
Fig. 5 represents a fragmentary cross-section of a window frame and groove, together with a cross-section of my improved strip shown applied to such groove, and before the sliding window member is inserted in the strip.
Figure 2:
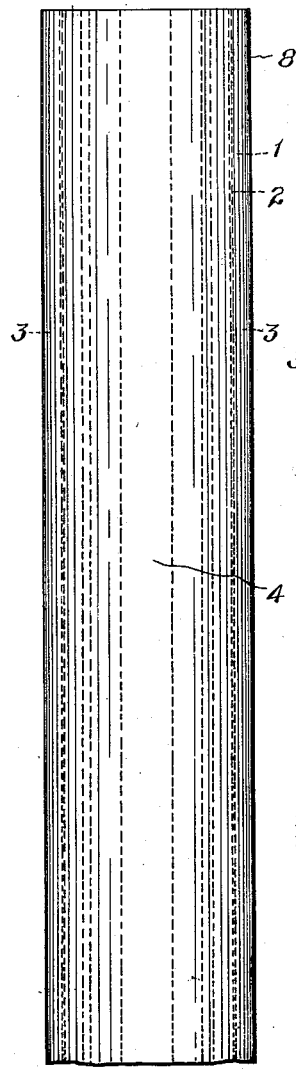
Fig. 2 represents a fragmentary rear elevation of such strip.
Figure 6:
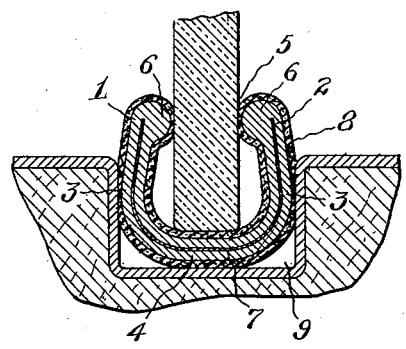
Fig. 6 represents a view similar to Fig. 5, showing the form of the strip with the sliding window member inserted therein.

After the strip has been inserted in the groove 9 as shown in Fig. 5, the outer slot 5 will have been contracted, and the cross-sectional dimensions of the strip being such that the width of the slot will be considerably less than the thickness of the sliding pane. When the latter is inserted, the flanges will be sprung outwardly and set up strains in the resilient member 2, which will cause the flanges of the strip to press tightly against the opposite sides of the pane, Fig. 6, and hold same securely in place, and at the same time the force of engagement between the groove and strip will be increased. It will also be seen that such result may be obtained with panes varying in thickness within certain limits.

While the strip is transversely elastic by virtue of its above-described cross-sectional form, the steel insert is longitudinally stiff and greatly resistant to a change of the longitudinal dimension of the strip. As a result, buckling of the strip is prevented when the pane is slid up or down therein.

In this manner I obtain a strip which combines the sound deadening and cushioning qualities of a compressible material such as a soft rubber composition to produce the required cushioning and anti-rattling effect, with the resilience of a metal such as steel to produce the required engagement between the strip and groove and between the strip and sliding window pane, and at the same time secure a construction adjustable to different widths of grooves and thicknesses of window panes.

Figure 3:
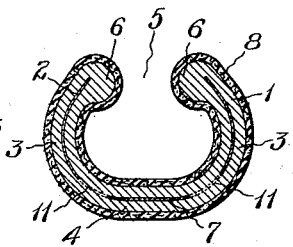
Fig. 3 represents a cross-section, on a similar scale, of a modified form, and Fig. 4, a fragmentary rear elevation of said modified form, with parts stripped away to disclose the inner resilient member.
Figure 4:
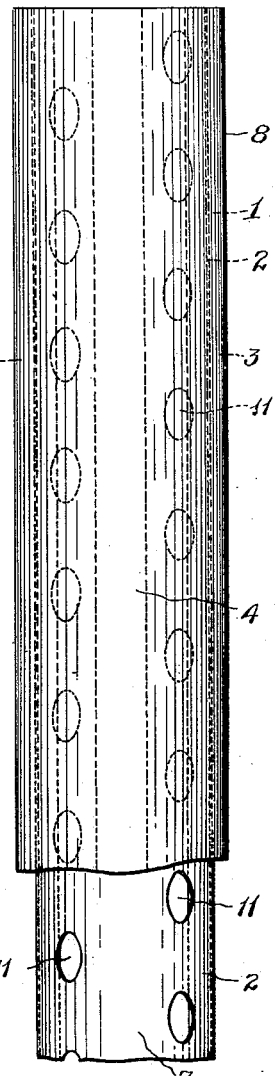

It will be understood that, when rubber composition is used as the cushioning material, it will be vulcanized on the steel insert, in which event sufficient engagement between the said composition and the insert will be secured to prevent the latter from becoming displaced, but if further insurance against such displacement is desired, the steel insert may be provided with perforations 11, Fig. 4, and the rubber composition caused to pass therethrough, as shown in Fig. 3.

Inasmuch as the steel insert retains its resiliency indefinitely, it will be noted that the effective life of my improved strip in so far as relates to resilience is likewise indefinite and does not depend upon the resiliency of the cushioning material as has heretofore been the case when the body-portions of these strips have been made of rubber composition alone.

Various ways of manufacturing the above-described strip may be employed, and which are all well known to those skilled in the art of manufacturing metallic articles covered or combined with rubber composition, and hence need not be described herein.

What I claim is:

1. The combination with a grooved window frame, of a window channel therefor, comprising a channel member of generally C-shaped cross section adapted for insertion in the frame groove and having a resilient sheet metal core and a flexible moisture proof covering therefor, said channel having bowed side walls terminating in lips for resilient engagement with a glass pane between them, said walls having their outer crests substantially midway of their height and adapted for resilient engagement with the walls of the groove, and the width of said groove being less than the normal over all dimension across the channel from crest to crest, whereby the channel when in the groove is under initial lateral compressive stress and is thereby self-accommodating to variations in both width of groove and thickness of glass.

2. The combination with a grooved window frame, of a window channel therefor, comprising a channel member of generally C-shaped cross section adapted for insertion in the frame groove and having a resilient sheet metal core and a non-metallic flexible covering therefor, said channel having bowed side walls terminating in lips for resilient engagement with a glass pane between them, said walls having their outer crests substantially midway of their height and adapted for resilient engagement with the grooved walls, said covering being shaped to form inwardly extending thickened beads at the lips of the core, whereby said glass pane is protected from the edges of said core, and the width of said groove being less than the normal over all dimension across the channel from crest to crest, whereby the channel when in the groove is under initial lateral compressive stress and is thereby self-accommodating to variations in both width of groove and thickness of glass.

Signed by me this 30th day of July, 1927.

CHRISTOPHER F. LOCKMAN.